(12) United States Patent
Savir et al.

(10) Patent No.: US 11,153,373 B2
(45) Date of Patent: Oct. 19, 2021

(54) METHOD AND SYSTEM FOR PERFORMANCE-DRIVEN LOAD SHIFTING

(71) Applicant: EMC IP Holding Company LLC, Hopkinton, MA (US)

(72) Inventors: Amihai Savir, Sansana (IL); Avitan Gefen, Lehavim (IL); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/403,365

(22) Filed: May 3, 2019

(65) Prior Publication Data

US 2020/0351339 A1 Nov. 5, 2020

(51) Int. Cl.
*H04L 29/08* (2006.01)
*G06F 9/455* (2018.01)

(52) U.S. Cl.
CPC ...... *H04L 67/1027* (2013.01); *G06F 9/45558* (2013.01); *H04L 67/26* (2013.01); *H04L 67/2861* (2013.01); *G06F 2009/4557* (2013.01); *G06F 2009/45595* (2013.01)

(58) Field of Classification Search
CPC .................................................. H04L 67/26
See application file for complete search history.

(56) References Cited

U.S. PATENT DOCUMENTS

| 6,801,940 | B1 | 10/2004 | Moran et al. |
| 7,784,098 | B1 | 8/2010 | Fan et al. |
| 7,885,902 | B1 | 2/2011 | Shoemaker et al. |
| 8,516,308 | B1 | 8/2013 | Gill et al. |
| 8,719,814 | B2 | 5/2014 | Wookey |
| 8,863,022 | B2 | 10/2014 | Rhodes et al. |
| 8,935,393 | B1 | 1/2015 | Jackson et al. |
| 9,037,922 | B1 | 5/2015 | Cabrera et al. |
| 2004/0059544 | A1 | 3/2004 | Smocha et al. |
| 2007/0094281 | A1 | 4/2007 | Malloy et al. |
| 2007/0288572 | A1 | 12/2007 | Busa |
| 2009/0210378 | A1 | 8/2009 | Benson et al. |
| 2011/0047594 | A1 | 2/2011 | Mahaffey et al. |

(Continued)

OTHER PUBLICATIONS

Javier Hernandez et al.; "Under Pressure: Sensing Stress of Computer Users"; Proceedings of the SIGCHI Conference on Human Factors in Computing Systems (CHI '14); Apr. 2014 (https://doi.org/10.1145/2556288.2557165).

(Continued)

*Primary Examiner* — Ario Etienne
*Assistant Examiner* — Sm Z Islam
(74) *Attorney, Agent, or Firm* — Chamberlain, Hrdlicka, White, Williams, & Aughtry

(57) ABSTRACT

A method and system for performance-driven load shifting. Specifically, the method and system disclosed herein entail transferring user program workloads, for processing, between local computing resources available on a client device and cloud computing resources available on an offload domain based on the assessed performance score of the client device at any given point in time. Seamless load shifting is further guaranteed due substantively to the employment of a mobile network facilitating communications between the client device and the offload domain.

14 Claims, 7 Drawing Sheets

(56) References Cited

U.S. PATENT DOCUMENTS

| | | |
|---|---|---|
| 2012/0192014 A1 | 7/2012 | Kato |
| 2013/0152047 A1 | 6/2013 | Moorthi et al. |
| 2013/0311836 A1 | 11/2013 | Hurst et al. |
| 2014/0024348 A1 | 1/2014 | Hurst et al. |
| 2014/0088895 A1 | 3/2014 | Houston et al. |
| 2014/0278895 A1 | 9/2014 | Grimes et al. |
| 2014/0372356 A1 | 12/2014 | Bilal et al. |
| 2015/0082097 A1 | 3/2015 | Brewer et al. |
| 2015/0133076 A1 | 5/2015 | Brough |
| 2015/0163121 A1 | 6/2015 | Mahaffey et al. |
| 2015/0220871 A1* | 8/2015 | Rajan ............ G06Q 10/063112 705/7.14 |
| 2015/0339736 A1 | 11/2015 | Bennett |
| 2015/0347220 A1 | 12/2015 | Hermany et al. |
| 2016/0306689 A1 | 10/2016 | Jain |
| 2016/0364279 A1 | 12/2016 | Brew et al. |
| 2016/0373944 A1 | 12/2016 | Jain et al. |
| 2017/0046243 A1 | 2/2017 | Shinde et al. |
| 2017/0076431 A1* | 3/2017 | Dai ........................ G06T 5/009 |
| 2017/0139762 A1 | 5/2017 | Sherlock et al. |
| 2018/0060744 A1 | 3/2018 | Achin et al. |
| 2018/0307535 A1* | 10/2018 | Suzuki ................. G06F 3/0683 |
| 2019/0340001 A1* | 11/2019 | Vysotsky .............. G06F 3/1454 |
| 2020/0019393 A1 | 1/2020 | Vichare et al. |
| 2020/0036603 A1 | 1/2020 | Nieves et al. |

OTHER PUBLICATIONS

Manuel Rodrigues et al.; "Keystrokes and Clicks: Measuring Stress on E-learning Students"; Management Intelligent Systems, Advances in Intelligent Systems and Computing (AISC); Springer, Heidelberg; 2013 (https://doi.org/10.1007/978-3-319-00569-0_15).

* cited by examiner

METHOD AND SYSTEM FOR PERFORMANCE-DRIVEN LOAD SHIFTING

BACKGROUND

Moving to the next-generation standard for wireless communications will enable the transmission and reception of messages at superior speeds with low latency. This opens opportunities for leveraging cloud computing resources for processing data, stored on a local devices, while offering services seamlessly to the user.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for performance-driven load shifting. Specifically, one or more embodiments of the invention entails transferring user program workloads, for processing, between local computing resources available on a client device and cloud computing resources available to an offload domain based on the assessed performance score of the client device at any given point in time. Seamless load shifting is further guaranteed due substantively to the employment of a 5G mobile network facilitating communications between the client device and the offload domain.

Figure 1A:
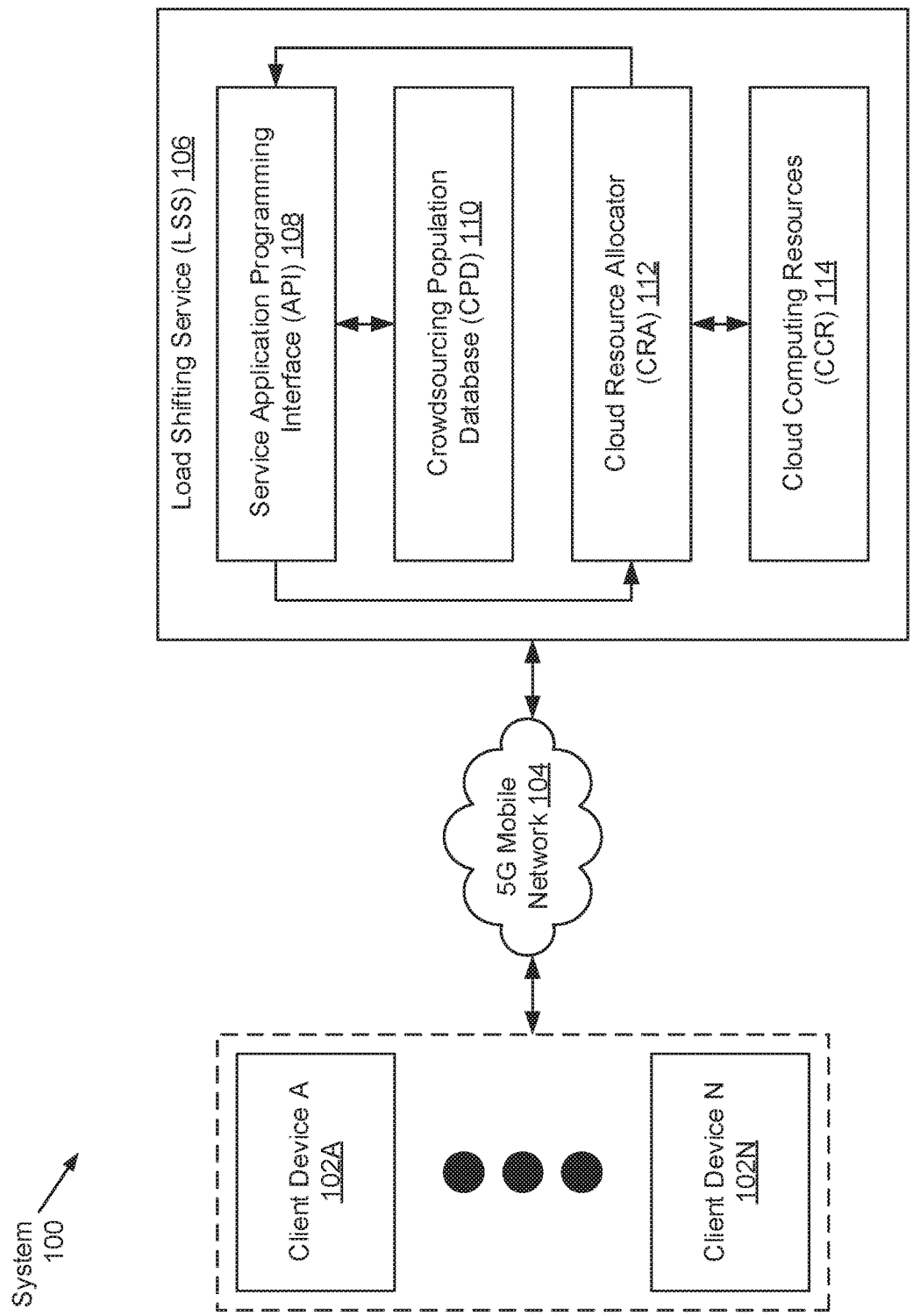
FIG. 1A shows a system in accordance with one or more embodiments of the invention.

FIG. 1A shows a system in accordance with one or more embodiments of the invention. The system (100) may include one or more client devices (102A-102N) operatively connected to a load shifting service (LSS) (106) through a 5G mobile network (104). Each of these system (100) components is described below.

In one embodiment of the invention, a client device (102A-102N) may represent any physical appliance or computing system designed and configured to receive, generate, process, store, and/or transmit data. One of ordinary skill will appreciate that a client device (102A-102N) may perform other functionalities without departing from the scope of the invention. Examples of a client device (102A-102N) may include, but are not limited to, a desktop computer, a tablet computer, a laptop computer, a server, a smartphone, or any other computing system similar to the exemplary computing system shown in FIG. 6. A client device (102A-102N) is described in further detail below with respect to FIG. 1B.

In one embodiment of the invention, the 5G mobile network (104) may represent a communication network that employs a next-generation standard for wireless communications. The 5G mobile network (104) may deliver increased capacity (i.e., bandwidth), lower latency, and faster speeds over the existing wireless communication standards. With these advantages, applications (e.g., the proposed method and system for performance-driven load shifting) employing the 5G mobile network (104) (or other networking protocols or technologies that provide low latency data transfer and/or communication) may operate seamlessly.

In one embodiment of the invention, the LSS (106) may represent a back-end system that supports load shifting agent (LSA) (i.e., front-end application) (not shown) (see e.g., FIG. 1B) functionality on the client device(s) (102A-102N). To that extent, the LSS (106) may be designed and configured to host and provision higher performing resources (e.g., cloud computing resources (CCR) (114) or virtual appliances (not shown)) relative to local resources (e.g., computing, memory, storage, network bandwidth, etc.) available on the client device(s) (102A-102N). Workloads associated with user programs, executing on the client device(s) (102A-102N), may be shifted (or offloaded) to these higher performing resources on the LSS (106) based on assessments entailing client device (102A-102N) performance.

In one embodiment of the invention, the LSS (106) may be implemented using one or more servers (not shown). Each server may be a physical server, which may reside in a datacenter, or a virtual server, which may reside in a cloud computing environment. Additionally or alternatively, the LSS (106) may be implemented using one or more computing systems similar to the exemplary computing system shown in FIG. 6. Furthermore, the LSS (106) may include a service application programming interface (API) (108), a crowdsourcing population database (CPD) (110), a cloud resource allocator (CRA) (112), and a diversity of cloud computing resources (CCR) (114). Each of these LSS (106) subcomponents is described below.

In one embodiment of the invention, the service API (108) may refer to a set of subroutine definitions, protocols, and/or tools directed to enabling communications between the LSS (106) and other external entities (e.g., the client device(s) (102A-102N)). The service API (108) may be implemented using LSS (106) hardware (e.g., computer processors, memory, storage, etc.), software elements (e.g., processes, threads, routines, etc.) executing thereon, or a combination thereof. Further, the service API (108) may include functionality to: service CPB queries and/or CPB contributions from the client device(s) (102A-102N), which may entail accessing the CPB (110); delegate cloud resource requests from the client device(s) (102A-102N) to the CRA (112); obtain virtual appliance credentials and/or cloud resource credentials from the CRA (112) in response to delegated cloud resource requests; provide obtained virtual appliance credentials and/or cloud resource credentials to cloud resource requesting client device(s) (102A-102N); and establish and maintain 5G mobile network (104) facilitated communication channel(s) between the client device(s) (102A-102N) and the CRA (112). One of ordinary skill will appreciate that the service API (108) may perform other functionalities without departing from the scope of the invention.

In one embodiment of the invention, the CPD (110) may refer to a data structure or data repository for aggregating, storing, and tracking client hardware configuration information (HCI) (described below) associated with the client device(s) (102A-102N). The CPD (110) may be maintained on one or more physical storage devices (not shown) residing on the LSS (106). Each physical storage device may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

Generally, in one embodiment of the invention, HCI may refer to information disclosing the specification of a given computing system (see e.g., FIG. 6), which may include, but is not limited to, metadata describing hardware components and/or an operating system (OS) installed on the given computing system. By way of examples, HCI may encompass any subset or all of the following information: an identifier or name associated with the OS; a build or version number associated with the OS; a number of central processing units (CPUs) installed; an architecture (e.g., x86-based or x64-based) associated with the CPU(s); a number of cores or micro-cores in each CPU; a processing speed associated with the CPU(s); a number of graphics processing units (GPUs) installed; an architecture (e.g., x86-based or x64-based) associated with the GPU(s); a number of cores or micro-cores in each GPU; a capacity of physical memory (PM) installed; and a page size (or a size of a block of memory) associated with the PM. HCI may not be limited to the aforementioned examples.

Further, in one embodiment of the invention, each HCI stored in the CPD (110) may map to (or associate with) one or more client device (102A-102N) performance scores, user program identifiers, and/or configuration costs. A client device (102A-102N) performance score may measure the overall performance of a given client device (102A-102N) while at least the user program(s), associated with the user program identifier(s), were executing on the given client device (102A-102N). Using this information, optimal HCI, for executing a given user program, may be identified.

In one embodiment of the invention, optimal HCI may refer to HCI outlining (or associated with) a computing system that is optimally configured to at least execute a given user program without performance issues. The optimal HCI may be selected from a subset of various HCI, aggregated in the CPD (110), where the various HCI subset correspond to a subset of the client device(s) (102A-102N), respectively, which have all historically executed the given user program without performance issues. Furthermore, selection of the optimal HCI may be based on a performance score that measures the capability of a given computing system configuration. Generally, a higher performance score may be associated with a computing system that performs faster and more efficiently than another computing system that may be associated with a lower performance score, especially while at least the given user program is executing on the computing systems.

In one embodiment of the invention, multiple client devices (102A-102N) (and, more specifically, multiple HCIs) may be associated with equally high performance scores, which had been measured while at least the given user program had been executing on each of the multiple client devices (102A-102N). In such an embodiment, selection of the optimal HCI may further be based on a configuration cost associated with the HCIs. That is, for example, the HCI associated with the lowest configuration cost, of multiple, equally high-performing HCIs, may be identified as the optimal HCI. The configuration cost associated with a given computing system and, subsequently, a given HCI, may refer to the monetary cost of the resources of the HCI(s) that are used (or that may be used). The monetary cost of the resources may be set by and/or obtained from a third-party.

In one embodiment of the invention, the CRA (112) may refer to a computer program, which may execute on the underlying hardware of the LSS (106), and may be designed and configured to manage the allocation and/or utilization of the CCR (114). To that extent, the CRA (112) may include functionality to: obtain optimal HCI (described above) from the service API (108); provision appropriate subsets of CCR (114) based on the obtained optimal HCI, such that the provisioned CCR (114) are comparable to or better than the resource specification specified in the optimal HCI; create virtual appliances (i.e., virtual machines) over the provisioned CCR (114); obtain client images (described above) from the service API (108); configure or initialize created virtual appliances using the client images (if any had been obtained); generate virtual appliance credentials (described below) for created virtual appliances, or CCR (114) credentials (described below) for provisioned CCR (114); provide generated virtual appliance or CCR (114) credentials to the service API (108); and establish connections and subsequent data exchanges with the client device(s) (102A-102N) using the 5G mobile network (104). One of ordinary skill will appreciate that the CRA (112) may perform other functionalities without departing from the scope of the invention.

In one embodiment of the invention, the CCR (114) may refer to physical or virtual computing system resources that have been made available in a cloud computing environment. CCR (114) may encompass any subset or all of the following computing system resources: one or more network resources, one or more compute resources, one or more virtualization resources, and one or more storage resources. CCR (114) may not be limited to the aforementioned examples.

In one embodiment of the invention, a network resource may refer to a measurable quantity of a network-relevant resource type that can be requested, allocated, and consumed. A network-relevant resource type may pertain to a physical device (i.e., hardware), a logical intelligence (i.e., software), or a combination thereof, which provides networking functionality. Further, each network-relevant resource type may be quantified through a respective base unit. By way of examples, a network interface card (NIC) or a network adapter may represent network-relevant resource types, which may be specified in base units of bits per second (bps).

In one embodiment of the invention, a compute resource may refer to a measurable quantity of a compute-relevant resource type that can be requested, allocated, and consumed. A compute-relevant resource type may pertain to a physical device (i.e., hardware), a logical intelligence (i.e., software), or a combination thereof, which provides computing functionality. Further, each compute-relevant resource type may be quantified through a respective base unit. By way of an example, a central processing unit (CPU) and/or a graphics processing unit (CPU) may represent compute-relevant resource types, which may be specified in base units of cores. By way of another example, memory (e.g., random access memory (RAM)) may represent another compute-relevant resource type, which may be specified in base units of bytes.

In one embodiment of the invention, a virtualization resource may refer to a measurable quantity of a virtualization-relevant resource type that can be requested, allocated, and consumed. A virtualization-relevant resource type may pertain to a physical device (i.e., hardware), a logical intelligence (i.e., software), or a combination thereof, which provides virtualization functionality. Further, each virtualization-relevant resource type may be quantified through a respective base unit. By way of an example, a virtual machine or a container represent virtualization-relevant resource types, which may be specified in base units of virtual CPUs (vCPU), where each vCPU may be viewed as a single physical CPU core.

In one embodiment of the invention, a storage resource may refer to a measurable quantity of a storage-relevant resource type that can be requested, allocated, and consumed. A storage-relevant resource type may pertain to a physical device (i.e., hardware), a logical intelligence (i.e., software), or a combination thereof, which provides data storage functionality. Further, each storage-relevant resource type may be quantified through a respective base unit. By way of examples, a hard disk drive (HDD), a solid state drive (SSD), and flash memory may each be a storage-relevant resource type, which may each be specified in base units of bytes.

While FIG. 1A shows a configuration of components, other system (100) configurations may be used without departing from the scope of the invention. For example, while the system is described with respect to a 5G mobile network, embodiments of the invention may be implemented using other types of mobile networks, which may implement additional and/or different mobile communication protocols without departing from the invention.

Figure 1B:
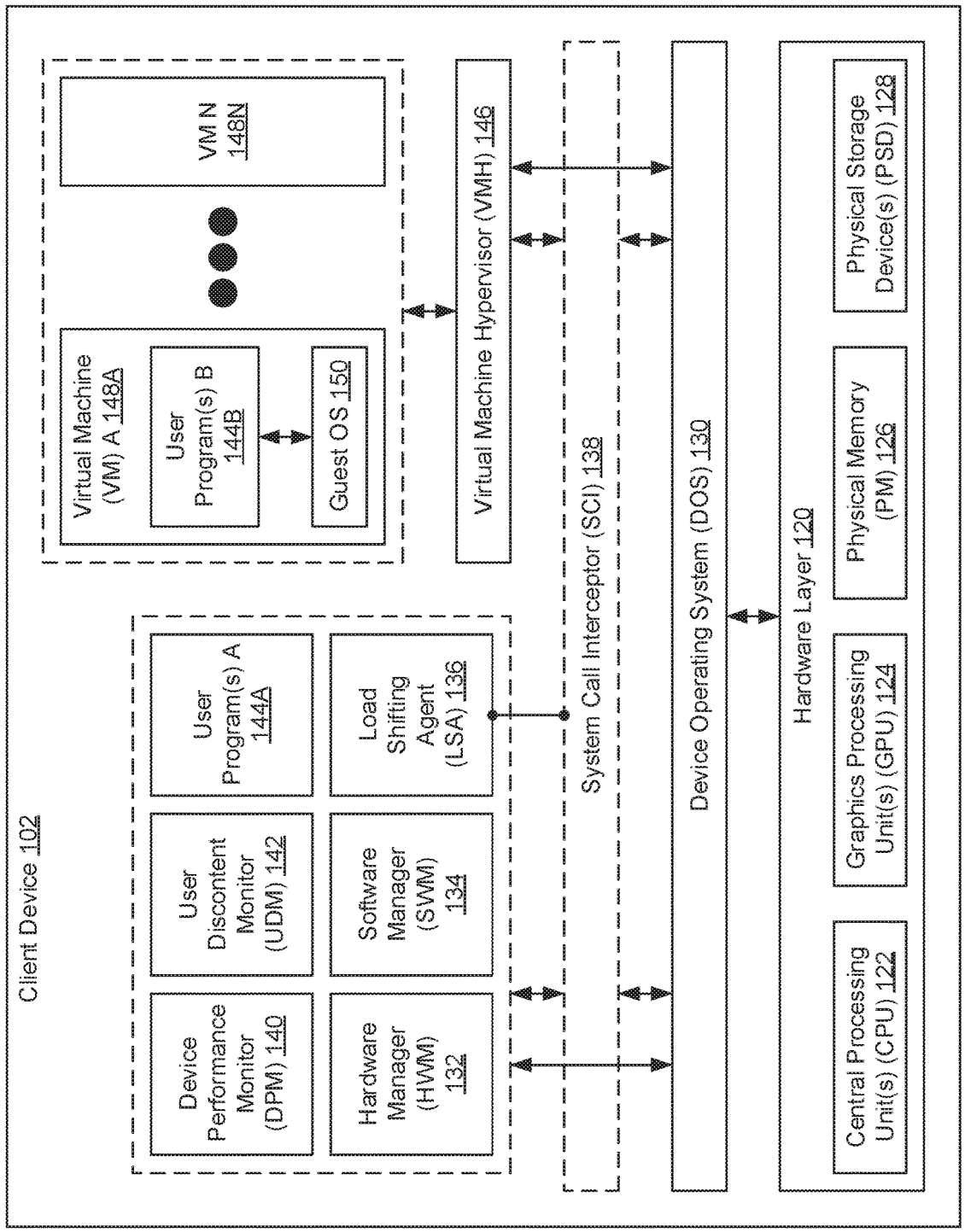
FIG. 1B shows a client device in accordance with one or more embodiments of the invention.

FIG. 1B shows a client device in accordance with one or more embodiments of the invention. The client device (102) may include a hardware layer (102), a device operating system (DOS) (130), a hardware manager (HWM) (132), a software manager (SWM) (134), a load shifting agent (LSA) (136), a device performance monitor (DPM) (140), a user discontent monitor (UDM), one or more user programs (144A), and a virtual machine hypervisor (VMH) (146). Each of these client device (102) components is described below.

In one embodiment of the invention, the hardware layer (120) may refer to a portion of the client device (102) architecture that includes various physical and/or tangible components. Collectively, these various physical and/or tangible components may enable and provide the framework and resources on which various logical or virtual elements, hosted on the client device (102), may operate. Accordingly, the hardware layer (102) may include, but is not limited to, one or more central processing units (CPUs) (122), zero or more graphics processing units (GPUs) (124), physical memory (PM) (126), and one or more physical storage devices (PSDs) (128). Each of these hardware layer (120) subcomponents is described below.

In one embodiment of the invention, a CPU (122) may refer to an integrated circuit designed and configured for processing instructions (e.g., computer readable program code). A CPU (122) may encompass one or more cores, or micro-cores, which may be optimized to execute sequential or serial instructions at high clock speeds. Further, a CPU (122) may be more versatile than a GPU (124) and, subsequently, may handle a diversity of functions, tasks, and/or activities. Towards processing instructions, a CPU (122) may, on occasion and for specific computational tasks, interact with the GPU(s) (124) (if available and installed on the client device (102)).

In one embodiment of the invention, a GPU (124) may refer to a specialized CPU (or integrated circuit) designed and configured to render graphics and/or perform specific computation tasks. A GPU (124) may encompass hundreds or thousands of cores, or micro-cores, which may be optimized to execute parallel operations at slower clock speeds. Through their massively parallel architecture, a GPU (124) may be superior to a CPU (122) in processing power, memory bandwidth, speed, and efficiency when executing tasks that predominantly require multiple parallel processes such as, for example, graphics rendering, machine learning, big data analysis, and other large-scale, complex computational tasks.

In one embodiment of the invention, PM (126) may refer to physical, volatile memory representative of dedicated and/or shared memory. Dedicated memory may refer to PM (126) that may only be accessible to a given hardware component. Alternatively, shared memory refer to PM (126) that may be accessible to two or more different hardware components. Examples of PM (126) may include, but are not limited to, static random access memory (RAM) (SRAM), dynamic RAM (DRAM), and video RAM (VRAM). PM (126) may not be limited to the aforementioned examples.

In one embodiment of the invention, a PSD (128) may refer to data storage on which various forms of information may be consolidated or stored. The information may be stored in entirety or in part, and permanently or temporarily. Further, each PSD (128) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the DOS (130) may refer to a computer program, which execute on at least a portion of the hardware layer (120), and may be designed and configured to manage the utilization of the hardware layer (120) by the various logical or virtual elements (e.g., HWM (132), SWM (134), LSA (136), DPM (140), UDM (142), user program(s) (144A), VMH (146), etc.) that may be operating on the client device (102). Accordingly, the DOS (130) may include functionality to: support fundamental client device (102) functions; schedule tasks; service system calls; allocate client device (102) resources; execute or invoke one or more of the aforementioned logical or virtual elements that may be operating on the client device (102); and control peripherals (e.g., input and output devices (not shown)). One of ordinary skill will appreciate that the DOS (130) may perform other functionalities without departing from the scope of the invention.

In one embodiment of the invention, the HWM (132) may refer to a computer program, which may execute on at least a portion of the hardware layer (120), and may be designed and configured to aggregate hardware metadata (described below). Accordingly, the HWM (132) may include functionality to: maintain a device metadata store (not shown)—e.g., a data structure or data repository in which device metadata packages (described below), respective to one or more hardware layer (120) subcomponents (e.g., CPU(s) (122), GPU(s) (124), PM (126), PSD(s) (128), etc.), may be stored; receive queries with respect to hardware metadata; and respond to these queries using at least a portion of the hardware metadata maintained in the aforementioned device metadata store. One of ordinary skill will appreciate that the HWM (132) may perform other functionalities without departing from the scope of the invention.

In one embodiment of the invention, hardware metadata may refer to information that describes one or more hardware layer (120) subcomponents. Examples of hardware metadata may include, but are not limited to, a manufacturer responsible for manufacturing the hardware layer (120) subcomponent; a model name or number assigned to the hardware layer (120) subcomponent; a device driver (e.g., firmware) provider, if any, associated with the hardware layer (120) component; a device driver deployment timestamp encoding a date and/or time on which the aforementioned device driver had been deployed; a device driver version or build number associated with the aforementioned device driver, if any, of the hardware layer (120) subcomponent; a number of cores, or micro-cores, constituting a computer processor type hardware layer (120) subcomponent; a storage capacity defining a memory or storage type hardware layer (120) subcomponent; a communication bus type that which the hardware layer (120) subcomponent may use for communications; a product number for the hardware layer (120) subcomponent; and any other property or attribute that may describe the hardware layer (120) subcomponent.

In one embodiment of the invention, the SWM (134) may refer to a computer program, which may execute on at least a portion of the hardware layer (120), and may be designed and configured to aggregate software (i.e., logical or virtual element) metadata (described below). Accordingly, the SWM (134) may include functionality to: maintain a program metadata store (not shown)—e.g., a data structure or data repository in which program metadata packages (described below), respective to one or more logical or virtual elements operating on the client device (102), may be stored; receive queries regarding with respect to software metadata; and respond to these queries using at least a portion of the software metadata maintained in the aforementioned program metadata store. One of ordinary skill will appreciate that the SWM (134) may perform other functionalities without departing from the scope of the invention.

In one embodiment of the invention, software metadata may refer to information that describes one or more logical or virtual elements executing on the client device (102). Examples of software metadata may include, but are not limited to, a name or edition assigned to the logical element; a version or build number associated with the logical element; a product number for the logical element; an installation timestamp encoding a date and/or time that the logical element had been installed on the client device (102); a manufacturer or developer associated with the logical element; a storage capacity consumed by the logical element; a location indicating an installation address of the logical element on the client device (102); and any other property or attribute that may describe the logical or virtual element.

In one embodiment of the invention, the LSA (136) may refer to a computer program, which may execute on at least a portion of the hardware layer (120), and may be designed and configured to perform any subset or all of the various steps directed to receiving virtual appliance credentials (see e.g., FIG. 2), receiving cloud resource credentials (see e.g., FIG. 4), and performance-driven load shifting (see e.g., FIGS. 3 and 5) in accordance with one or more embodiments of the invention. Further, in one embodiment of the invention, the LSA (136) may include functionality to deploy a system call interceptor (SCI) (138) and/or an input device interceptor (IDI) (not shown) (described below). The SCI (138) may represent a hooking mechanism, implemented as computer readable program code, that includes functionality to: intercept system calls, issued by any given user program (144A, 144B), prior to reaching the DOS (130); and providing the intercepted system(s) to the LSA (136) for further handling. Similarly, the IDI may represent another hooking mechanism, implemented as computer readable program code, that includes functionality to: intercept input device outputs (described below), generated by any give input device (not shown), prior to reaching any given user program (144A, 144B) executing on the client device (102); and providing the intercepted input device output(s) to a virtual appliance residing on the LSS (106).

In one embodiment of the invention, the DPM (140) may refer to a computer program, which may execute on at least a portion of the hardware layer (120), and may be designed and configured to generate, aggregate, and publish real-time hardware performance scores (HPS) to subscribing computer programs executing on the client device (102). A subscription may refer to the periodic, or continuous, delivery of a data resource (e.g., HPS) from a data publisher (e.g., DPM (140)) to one or more data subscribers (e.g., LSA (136)). Further, each HPS may measure hardware component performance, at any given point in time, for a given hardware layer (120) subcomponent installed on the client device (102).

In one embodiment of the invention, the UDM (142) may refer to a computer program, which may execute on at least a portion of the hardware layer (120), and may be designed and configured to generate, aggregate, and publish real-time user discontent scores (UDS) to subscribing computer programs executing on the client device (102). A subscription may refer to the periodic, or continuous, delivery of a data resource (e.g., UDS) from a data publisher (e.g., DPM (140)) to one or more data subscribers (e.g., LSA (136)).

Further, the UDS may measure user satisfaction (or dissatisfaction) with the client device (102) at any given point in time. The measurement and quantification of user discontent is described in further detail in application Ser. No. 16/402,822, filed on May 3, 2019, which is hereby referenced and incorporated in its entirety In one embodiment of the invention, a user program (144A, 144B) may refer to a computer program, which may execute on at least a portion of the hardware layer (120) or on at least a portion of a virtual computing system (not shown) emulated by a virtual machine (VM) (148A-148N) (described below). Further, a user program (144A, 144B) may be designed and configured to perform one or more functions, tasks, and/or activities based on user interaction with the user program (144A, 144B). Accordingly, a user program (144A, 144B) may include functionality to: request and consume client device (102) resources (e.g., CPU(s) (122), GPU(s) (124), PM (126), PSD(s) (128), etc.); issue system calls requesting system services to the DOS (130), the VMH (146), and/or a guest OS (150) (described below); and receive call results in response to issued system calls from the DOS (130), the VMH (146), a guest OS (150), and/or the LSA (136). One of ordinary skill will appreciate that a user program (144A, 144B) may perform other functionalities without departing from the scope of the invention. Examples of a user program (144A, 144B) may include, but are not limited to, a word processor, an email client, a database client, a web browser, a media player, a file viewer, an image editor, a simulator, a game, a programming language editor and compiler, etc.

In one embodiment of the invention, the VMH (146) may refer to a computer program, which may execute on at least a portion of the hardware layer (120), and may be designed and configured to manage one or more VMs (148A-148N). Accordingly, the VMH (146) may include functionality to: create or delete VMs (148A-148N); allocate or deallocate client device (102) resources, which may be used to support the execution of the VM(s) (148A-148N) and their respective workloads; and facilitate communications between the VM(s) (148A-148N) and the DOS (130). One of ordinary skill will appreciate that the VMH (146) may perform other functionalities without departing from the scope of the invention.

Figure 6:
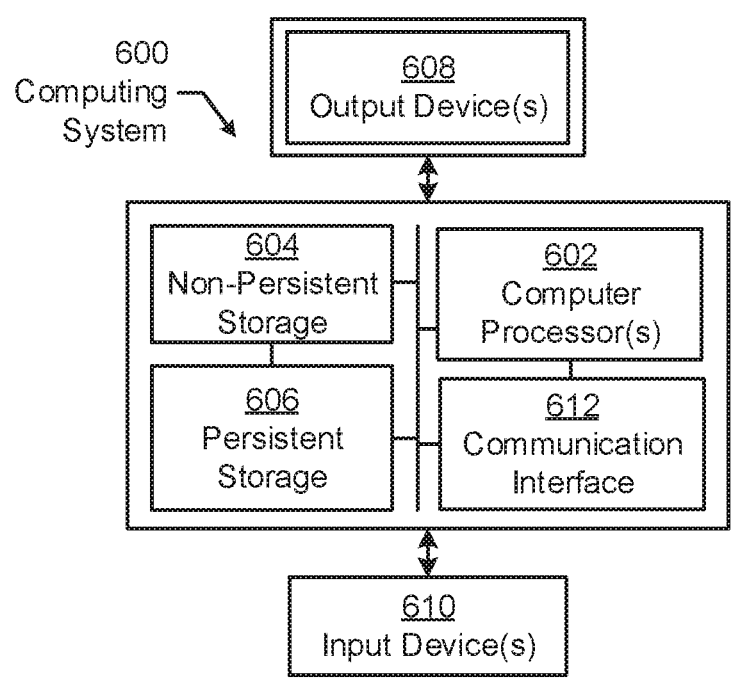
FIG. 6 shows a computing system in accordance with one or more embodiments of the invention.

In one embodiment of the invention, a VM (148A-148N) may refer to a computer program, which may execute on at least a portion of the hardware layer (120), and may be designed and configured to emulate a physical computing system (see e.g., FIG. 6). Accordingly, a VM (148A-148N) may provide a self-contained execution environment within which one or more user programs (144B) (described above) and a guest OS (150) may execute. Briefly, the guest OS (150) may refer to a computer program that implements an operating system responsible for managing the emulated computing system deployed in the VM (148A-148N). Further, the guest OS (150) may execute an operating system that is similar or different than the DOS (130). In one embodiment of the invention, a VM (148A-148N) may interact with the hardware layer (120) indirectly through the issuance of system calls that may be trapped and processed by the VMH (146), the DOS (130), and/or the SCI (138) of the LSA (136). One of ordinary skill will appreciate that a VM (148A-148N) may perform other functionalities without departing from the scope of the invention.

While FIG. 1B shows a configuration of components, other client device (102) configurations may be used without departing from the scope of the invention.

Figure 2:
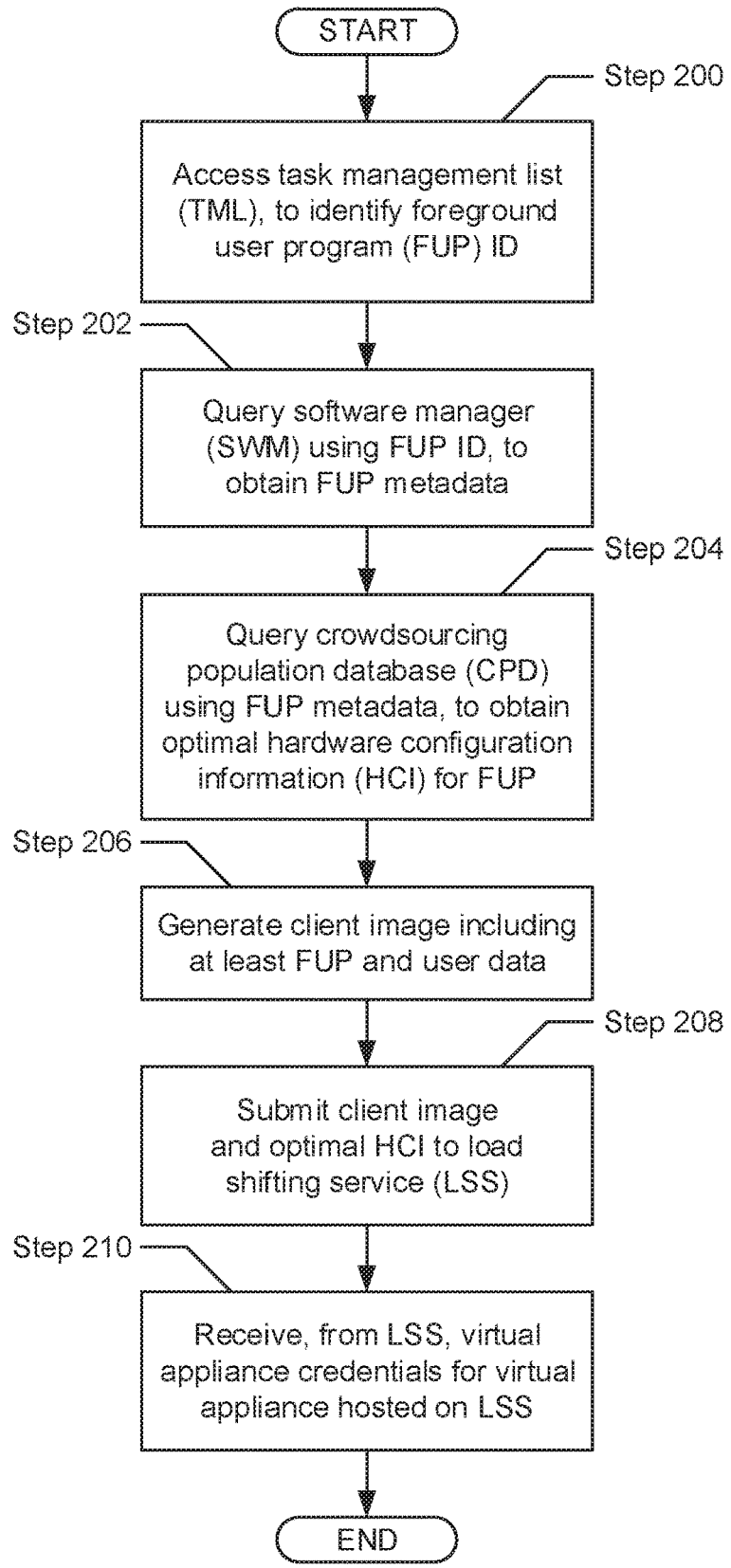
FIG. 2 shows a flowchart describing a method for receiving virtual appliance credentials in accordance with one or more embodiments of the invention.

FIG. 2 shows a flowchart describing a method for receiving virtual appliance credentials in accordance with one or more embodiments of the invention. The various steps outlined below may be performed by the load shifting agent (LSA) executing on a client device (see e.g., FIG. 1B). Further, while the various steps in the flowchart(s) are presented and described sequentially, one of ordinary skill will appreciate that some or all steps may be executed in different orders, may be combined or omitted, and some or all steps may be executed in parallel.

Turning to FIG. 2, in Step 200, a task management list (TML) is accessed, to identify a foreground user program (FUP) identifier (ID). In one embodiment of the invention, the TML may refer to a data structure that tracks which user programs, processes, and services may be currently executing on the client device. For each user program, process, or service mentioned in the TML, any subset or all of the following information associated with the user program, process, or service may also be disclosed therein: a unique ID or name belonging to the user program, process, or service; a metric measuring central processing unit (CPU) utilization by the user program, process, or service; a metric measuring graphics processing unit (GPU) utilization by the user program, process, or service; a metric measuring physical memory (PM) utilization by the user program, process, or service; a metric measuring physical storage device (PSD) utilization by the user program, process, or service; and a metric measuring network bandwidth utilization by the user program, process, or service. The information disclosed in the TML for each user program, process, or service may not be limited to the aforementioned examples.

In one embodiment of the invention, the FUP may refer to a user program with which the client device user may be currently interacting. Further, the FUP may distinguish itself, from other user programs currently executing on the client device, through the consumption (or utilization) of more client device resources than those consumed (or utilized) by the other user programs. That is, the FUP may refer to a user program that may exhibit any subset or all of the following characteristics: a highest CPU utilization metric value; a highest GPU utilization metric value; a highest PM utilization metric value; a highest PSD utilization metric value; and a highest network bandwidth utilization metric value. Characteristics pertinent to identifying the FUP may not be limited to the aforementioned examples.

In Step 202, a software manager (SWM) (see e.g., FIG. 1B) is queried using the FUP ID (identified in Step 200). In one embodiment of the invention, a response, from the SWM, to the query may include metadata describing the FUP—i.e., FUP metadata. Examples of FUP metadata that may be obtained may include, but is not limited to, a build or version number associated with the FUP, a number of bits (e.g., 32-bit or 64-bit) associated with a CPU on which the FUP may be optimized to execute, and a developing entity name associated with a developing entity of the FUP.

In Step 204, a crowdsourcing population database (CPD) (see e.g., FIG. 1A) is queried using the FUP metadata (obtained in Step 202). In one embodiment of the invention, a response, from the CPD, to the query may include optimal hardware configuration information (HCI) for executing the FUP. Generally, HCI may refer to information disclosing the specification of a given computing system (see e.g., FIG. 6), which may include, but is not limited to, metadata describing hardware components and/or an operating system (OS) installed on the given computing system. By way of examples, HCI may encompass any subset or all of the following information: an identifier or name associated with the OS; a build or version number associated with the OS; a number of CPUs installed; an architecture (e.g., x86-based or x64-based) associated with the CPU(s); a number of cores or micro-cores in each CPU; a processing speed associated with the CPU(s); a number of GPUs installed; an architecture (e.g., x86-based or x64-based) associated with the GPU(s); a number of cores or micro-cores in each GPU; a capacity of PM installed; and a page size (or a size of a block of memory) associated with the PM. HCI may not be limited to the aforementioned examples.

In one embodiment of the invention, optimal HCI may subsequently refer to HCI outlining (or associated with) a computing system that is optimally configured to at least execute the FUP. The optimal HCI may be selected from a subset of various HCI, aggregated in the CPD, where the various HCI subsets correspond to a subset of various other client devices, respectively, which have all historically executed the FUP. Furthermore, selection of the optimal HCI may be based on a performance score that measures the capability of a given computing system configuration. Generally, a higher performance score may be associated with a computing system that performs faster and more efficiently than another computing system that may be associated with a lower performance score, especially while at least the FUP is executing on the computing systems. In one embodiment of the invention, multiple client devices (and, more specifically, multiple HCIs) may be associated with equally high performance scores, which had been measured while at least the FUP had been executing on each of the multiple client devices. In such an embodiment, selection of the optimal HCI may further be based on a configuration cost associated with the HCIs. That is, for example, the HCI associated with the lowest configuration cost, of multiple, equally high-performing HCIs, may be identified as the optimal HCI. The configuration cost associated with a given computing system and, subsequently, a given HCI, may refer to the monetary cost of the resources of the HCI(s) that are used (or that may be used). The monetary cost of the resources may be set by and/or obtained from a third-party.

In Step 206, a client image is generated using at least the FUP associated with the FUP ID (identified in Step 200) and user data. In one embodiment of the invention, the client image may refer to an exact serialized copy (or clone) of the current state, in its entirety, of the client device. The aforementioned current state of the client device may include, but is not limited to, a process image (or a copy of state) for the FUP at the current point in time, which may encompass FUP-relevant user data (e.g., data created or owned by a user of the client device), the user program (e.g., the FUP, representing instructions to be executed), and a system stack (e.g., data stack(s) used to store parameters and calling addresses for procedure and system calls).

In Step 208, the client image (generated in Step 206) and the optimal HCI (obtained in Step 204) are subsequently submitted to the load shifting service (LSS) (see e.g., FIG. 1A). Specifically, in one embodiment of the invention, the aforementioned data items may be transmitted to the LSS over a 5G mobile network.

In Step 210, following the above-mentioned submission, virtual appliance credentials are received from the LSS. In one embodiment of the invention, the virtual appliance credentials may refer to access information pertinent to accessing and using a virtual appliance hosted on the LSS. By way of an example, the virtual appliance credentials may take form as an application programming interface (API) key for establishing a connection with and using provisioned (or allocated) cloud computing resources implementing the virtual appliance, where the API key may serve as both a unique service-generated identifier for the LSA and a secret token used for authentication. Furthermore, a virtual appliance may refer to an emulated physical computing system (see e.g., FIG. 6) (also referred herein as a virtual machine). The virtual appliance, with which the received virtual appliance credentials may be associated, may have been created and configured based on (i.e., may have been allocated cloud computing resources (CCR) comparable to) the optimal HCI (submitted in Step 208). Moreover, the virtual appliance may have further been configured (or initialized) with the current state of the client device captured in the client image (also submitted in Step 208).

Figure 3:
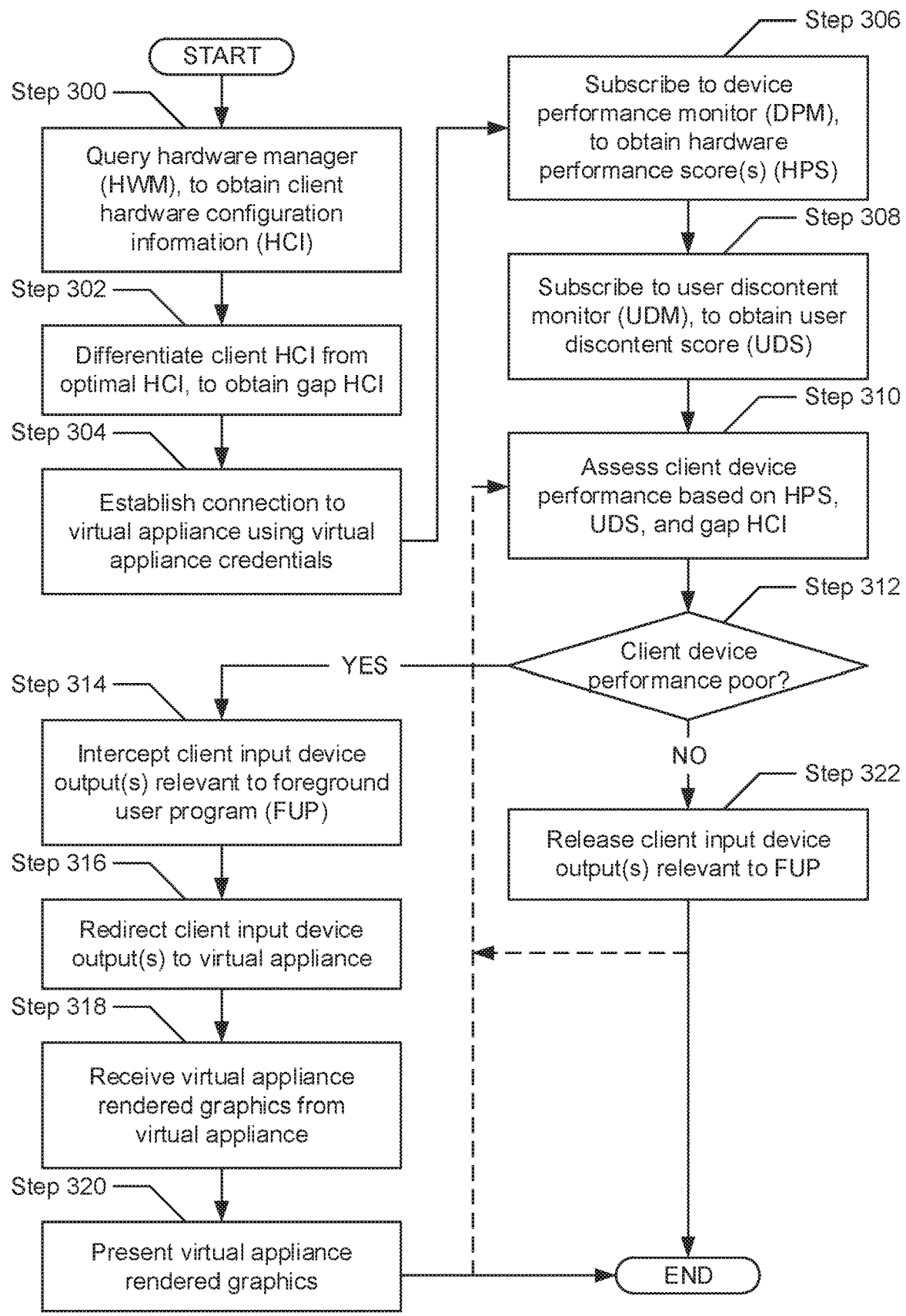
FIG. 3 shows a flowchart describing a method for performance-driven load shifting in accordance with one or more embodiments of the invention.

FIG. 3 shows a flowchart describing a method for performance-driven load shifting in accordance with one or more embodiments of the invention. The various steps outlined below may be performed by the load shifting agent (LSA) executing on a client device (see e.g., FIG. 1B). Further, while the various steps in the flowchart(s) are presented and described sequentially, one of ordinary skill will appreciate that some or all steps may be executed in different orders, may be combined or omitted, and some or all steps may be executed in parallel.

Turning to FIG. 3, in Step 300, a hardware manager (HWM) (see e.g. FIG. 1B) is queried. In one embodiment of the invention, a response, from the HWM, to the query may include client hardware configuration information (HCI). Generally, HCI may refer to information disclosing the specification of a given computing system (see e.g., FIG. 6), which may include, but is not limited to, metadata describing hardware components and/or an operating system (OS) installed on the given computing system. By way of examples, HCI may encompass any subset or all of the following information: an identifier or name associated with the OS; a build or version number associated with the OS; a number of CPUs installed; an architecture (e.g., x86-based or x64-based) associated with the CPU(s); a number of cores or micro-cores in each CPU; a processing speed associated with the CPU(s); a number of GPUs installed; an architecture (e.g., x86-based or x64-based) associated with the GPU(s); a number of cores or micro-cores in each GPU; a capacity of PM installed; and a page size (or a size of a block of memory) associated with the PM. HCI may not be limited to the aforementioned examples. Accordingly, the client HCI, obtained following the query, may refer to a current HCI associated with the client device.

In Step 302, the client HCI (obtained in Step 300) is differentiated from an optimal HCI (described above) (see e.g., FIG. 2). In one embodiment of the invention, a gap HCI may be obtained based on the differentiation. The gap HCI may refer to a HCI that discloses noted differences between the client HCI and the optimal HCI. For example, the gap HCI may be number of processor cores, where the client HCI has a processor with four cores and the optimal HCI has a processor with eight cores. In another example, the gap HCI may be the type of GPU, where the client HCI has a GPU from a first vendor and the optimal HCI is a GPU from a second vendor.

In Step 304, a connection to a virtual appliance (described above) (see e.g., FIG. 2) is established. In one embodiment of the invention, establishing the connection may entail submitting a connection request, including virtual appliance credentials associated with the virtual appliance, to a load shifting service (LSS) (see e.g., FIG. 1A). The LSS may represent an offload domain whereon the virtual appliance may be hosted, and where-to one or more user program workloads may be transferred (transparently or unbeknownst to the client device user) for processing in a higher performing environment. The established connection, and any subsequent information exchanges, between the client device (or specifically, the LSA executing on the client device) and the virtual appliance may employ the remote desktop protocol (RDP) or any other similar network protocol that provides remote display and input capabilities over a network (e.g., the 5G mobile network).

In Step 306, a subscription to a device performance monitor (DPM) (see e.g., FIG. 1B) is requested. In one embodiment of the invention, a subscription may refer to the periodic, or continuous, delivery of a data resource from a data publisher (e.g., DPM) to one or more data subscribers (e.g., LSA). Further, the data resource published (i.e., delivered or provided), to registered subscribers, may include a real-time hardware performance score (HPS) measuring hardware component performance, at any given point in time, for each hardware component installed on the client device. The aforementioned hardware components may include any subset or all of the following physical components: one or more CPUs, one or more GPUs, memory, data storage, and network adapters or antennae. Hardware components installed on the client device may not be limited to the aforementioned examples.

In Step 308, a subscription to a user discontent monitor (UDM) (see e.g., FIG. 1B) is requested. In one embodiment of the invention, a subscription may refer to the periodic, or continuous, delivery of a data resource from a data publisher (e.g., UDM) to one or more data subscribers (e.g., LSA). Further, the data resource published (i.e., delivered or provided), to registered subscribers, may include a real-time user discontent score (UDS) measuring user satisfaction (or dissatisfaction) with the client device at any given point in time.

In Step 310, a performance associated with the client device is assessed. In one embodiment of the invention, the client device performance may be evaluated based on the HPS (obtained in Step 306), the UDS (obtained in Step 308), and the gap HCI (obtained in Step 302). Specifically, assessing the client device performance may entail deriving an overall performance grade or score, for the client device, from at least the aforementioned constituent information. Such an overall performance grade or score may be expressed using a numerical (e.g., $\{1, 2, 3, \ldots, 10\}$) or categorical (e.g., $\{$"low", "medium", "high"$\}$) value, which may map to a given, prescribed performance class.

In Step 312, a determination is made as to whether the client device performance (assessed in Step 310) is directed to a poor or low performance classification. Accordingly, in one embodiment of the invention, if it is determined that a poor or low performance classification is given to reflect the overall performance of the client device, then the process may proceed to Step 314. On the other hand, in another embodiment of the invention, if it is alternatively determined that a non-poor or non-low (e.g., high, medium, excellent, etc.) performance classification is given to reflect the overall performance of the client device, then the process may alternatively proceed to Step 322.

In Step 314, after determining (in Step 312) that a current performance (i.e., client device performance) associated with the client device is directed to a poor or low performance classification, one or more client input device outputs is/are trapped and, subsequently, intercepted (i.e., redirected). In one embodiment of the invention, the intercepted client input device output(s) may be relevant to the FUP. A client input device may refer to a peripheral of the client device, which a client device user may manipulate to provide input or interact with user interface (UI) components presented to the client device user. Examples of a client input device may include, but are not limited to, a keyboard, a mouse, a camera, a microphone, a stylus pen, etc. A client input device output may thus refer to machine-readable data (e.g., binary data) representative of (or translated from) the manipulation on a given client input device by the client device user. By way of examples, client input device output may refer to machine-readable data that may capture keystrokes performed on a keyboard; and/or mouse clicks, scrolling, or movement performed on a mouse.

In Step 316, the client input device output(s) (intercepted in Step 314) is/are redirected to the virtual appliance (connected to in Step 304). In one embodiment of the invention, redirection of the client input device output(s) may entail transmission of the client input device output(s) (transparently or unbeknownst to the client device user) to the virtual appliance for interpretation. Had the client input device output(s) not been intercepted, the client input device output (s) may alternatively be interpreted by the CPU(s) and/or GPU(s) installed on the client device.

In Step 318, graphics rendered by, and from, the virtual appliance is received. Specifically, in one embodiment of the invention, the graphics may be generated by the FUP clone executing within the virtual appliance. Further, the aforementioned graphics may have been rendered following interpretation, by the virtual appliance, of the client input device output(s) (redirected in Step 316). Thereafter, in Step 320, the rendered graphics (received in Step 318) are presented to the client device user. In one embodiment of the invention, because the rendered graphics may represent the visualization of the FUP UI in response to the client input device output(s), presentation of the rendered graphics may entail providing the rendered graphics to the FUP executing on the client device, which would in turn present the rendered graphics to the client device user through the UI maintained by the FUP executing on the client device.

In Step 322, after alternatively determining (in Step 312) that a current performance (i.e., client device performance) associated with the client device is directed to a non-poor or non-low (e.g., "medium", "high", etc.) performance classification, one or more client input device outputs is/are trapped and, subsequently, released. In one embodiment of the invention, the released client input device output(s) may be relevant to the FUP. Further, by releasing the aforementioned client input device output(s), the client input device output(s) may continue forth to the CPU(s) and/or GPU(s) installed on the client device, which would interpret the client input device output(s).

In one embodiment of the invention, following either the presentation of virtual appliance rendered graphics (in Step 320) or the release of client input device output(s) (in Step 322), the process may cycle back to Step 310 or end. Regarding the former case, at Step 310, another client device performance may be assessed, which may reflect a same or different overall performance score associated with the client device for a subsequent point in time. Alternatively, regarding the latter case, the client device user may cease interaction with the FUP (e.g., by exiting the FUP, closing the FUP UI, etc.), which would lead to the termination of the process.

Figure 4:
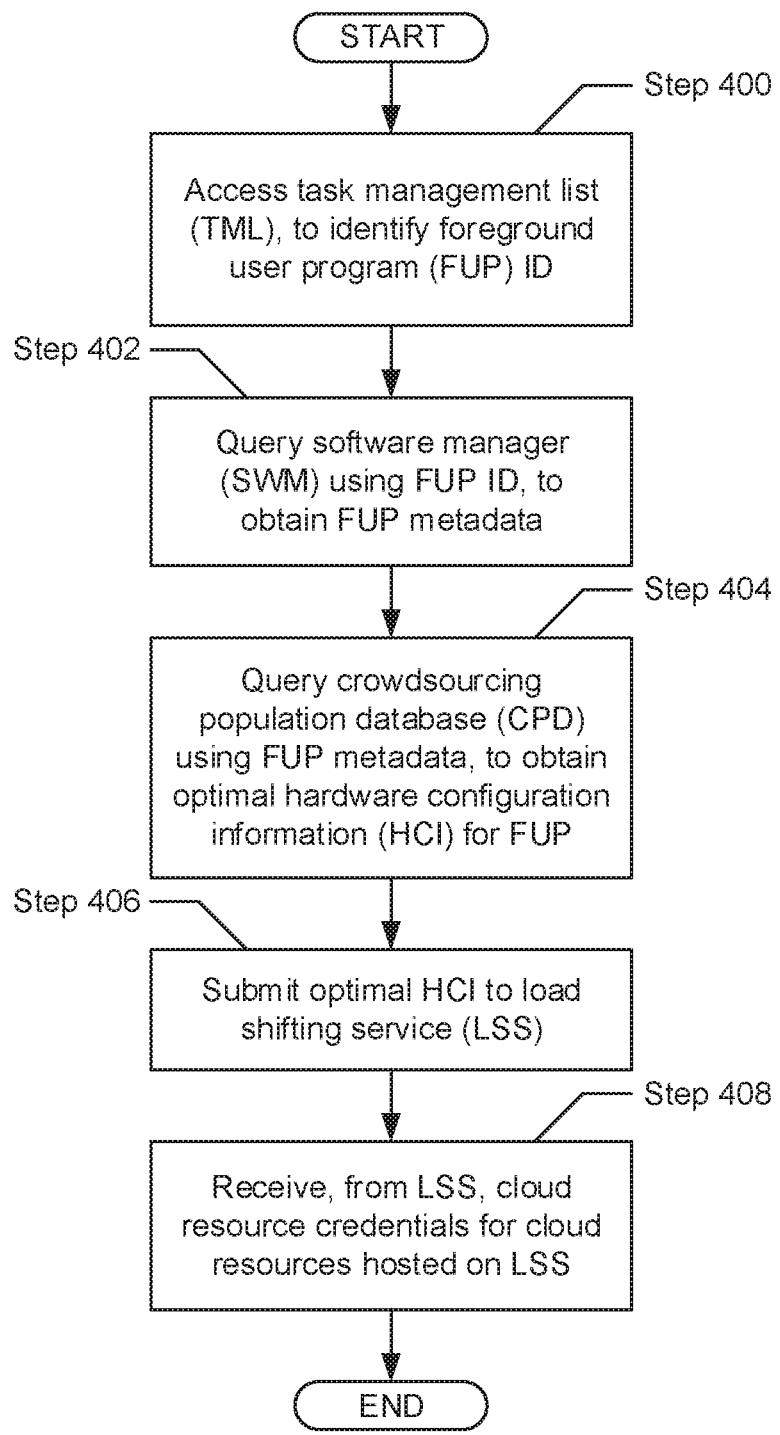
FIG. 4 shows a flowchart describing a method for receiving cloud resource credentials in accordance with one or more embodiments of the invention.

FIG. 4 shows a flowchart describing a method for receiving cloud resource credentials in accordance with one or more embodiments of the invention. The various steps outlined below may be performed by the load shifting agent (LSA) executing on a client device (see e.g., FIG. 1B). Further, while the various steps in the flowchart(s) are presented and described sequentially, one of ordinary skill will appreciate that some or all steps may be executed in different orders, may be combined or omitted, and some or all steps may be executed in parallel.

Turning to FIG. 4, in Step 400, a task management list (TML) is accessed, to identify a foreground user program (FUP) identifier (ID). In one embodiment of the invention, the TML may refer to a data structure that tracks which user programs, processes, and services may be currently executing on the client device. For each user program, process, or service mentioned in the TML, any subset or all of the following information associated with the user program, process, or service may also be disclosed therein: a unique ID or name belonging to the user program, process, or service; a metric measuring central processing unit (CPU) utilization by the user program, process, or service; a metric measuring graphics processing unit (GPU) utilization by the user program, process, or service; a metric measuring physical memory (PM) utilization by the user program, process, or service; a metric measuring physical storage device (PSD) utilization by the user program, process, or service; and a metric measuring network bandwidth utilization by the user program, process, or service. The information disclosed in the TML for each user program, process, or service may not be limited to the aforementioned examples.

In one embodiment of the invention, the FUP may refer to a user program with which the client device user may be currently interacting. Further, the FUP may distinguish itself, from other user programs currently executing on the client device, through the consumption (or utilization) of more client device resources than those consumed (or utilized) by the other user programs. That is, the FUP may refer to a user program that may exhibit any subset or all of the following characteristics: a highest CPU utilization metric value; a highest GPU utilization metric value; a highest PM utilization metric value; a highest PSD utilization metric value; and a highest network bandwidth utilization metric value. Characteristics pertinent to identifying the FUP may not be limited to the aforementioned examples.

In Step 402, a software manager (SWM) (see e.g., FIG. 1B) is queried using the FUP ID (identified in Step 400). In one embodiment of the invention, a response, from the SWM, to the query may include metadata describing the FUP—i.e., FUP metadata. Examples of FUP metadata that may be obtained may include, but is not limited to, a build or version number associated with the FUP, a number of bits (e.g., 32-bit or 64-bit) associated with a CPU on which the FUP may be optimized to execute, and a developing entity name associated with a developing entity of the FUP.

In Step 404, a crowdsourcing population database (CPD) (see e.g., FIG. 1A) is queried using the FUP metadata (obtained in Step 402). In one embodiment of the invention, a response, from the CPD, to the query may include optimal hardware configuration information (HCI) for executing the FUP. Generally, HCI may refer to information disclosing the specification of a given computing system (see e.g., FIG. 6), which may include, but is not limited to, metadata describing hardware components and/or an operating system (OS) installed on the given computing system. By way of examples, HCI may encompass any subset or all of the following information: an identifier or name associated with the OS; a build or version number associated with the OS; a number of CPUs installed; an architecture (e.g., x86-based or x64-based) associated with the CPU(s); a number of cores or micro-cores in each CPU; a processing speed associated with the CPU(s); a number of GPUs installed; an architecture (e.g., x86-based or x64-based) associated with the GPU(s); a number of cores or micro-cores in each GPU; a capacity of PM installed; and a page size (or a size of a block of memory) associated with the PM. HCI may not be limited to the aforementioned examples.

In one embodiment of the invention, optimal HCI may subsequently refer to HCI outlining (or associated with) a computing system that is optimally configured to at least execute the FUP. The optimal HCI may be selected from a subset of various HCI, aggregated in the CPD, where the various HCI subsets correspond to a subset of various other client devices, respectively, which have all historically executed the FUP. Furthermore, selection of the optimal HCI may be based on a performance score that measures the capability of a given computing system configuration. Generally, a higher performance score may be associated with a computing system that performs faster and more efficiently than another computing system that may be associated with a lower performance score, especially while at least the FUP is executing on the computing systems. In one embodiment of the invention, multiple client devices (and, more specifically, multiple HCIs) may be associated with equally high performance scores, which had been measured while at least the FUP had been executing on each of the multiple client devices. In such an embodiment, selection of the optimal HCI may further be based on a configuration cost associated with the HCIs. That is, for example, the HCI associated with the lowest configuration cost, of multiple, equally high-performing HCIs, may be identified as the optimal HCI. The configuration cost associated with a given computing system and, subsequently, a given HCI, may refer to the monetary cost of the resources of the HCI(s) that are used (or that may be used). The monetary cost of the resources may be set by and/or obtained from a third-party.

In Step 406, the optimal HCI (obtained in Step 404) is subsequently submitted to the load shifting service (LSS) (see e.g., FIG. 1A). Specifically, in one embodiment of the invention, the aforementioned data item may be transmitted to the LSS over a 5G mobile network.

In Step 408, following the above-mentioned submission, cloud computing resource credentials are received from the LSS. In one embodiment of the invention, the cloud computing resource credentials may refer to access information pertinent to accessing and using a subset of cloud computing resources available on the LSS. By way of an example, the cloud computing resource credentials may take form as an application programming interface (API) key for establishing a connection with and using a provisioned (or allocated) subset of cloud computing resources (e.g., one or more CPUs, one or more GPUs, memory, data storage, etc.), where the API key may serve as both a unique service-generated identifier for the LSA and a secret token used for authentication. Furthermore, the subset of cloud computing resources, with which the received cloud computing resource credentials may be associated, may have been provisioned based on the optimal HCI (submitted in Step 406). That is, the provisioned subset of cloud computing resources may be comparable to the specification of hardware components and/or operating system (OS) specified in the optimal HCI.

Figure 5:
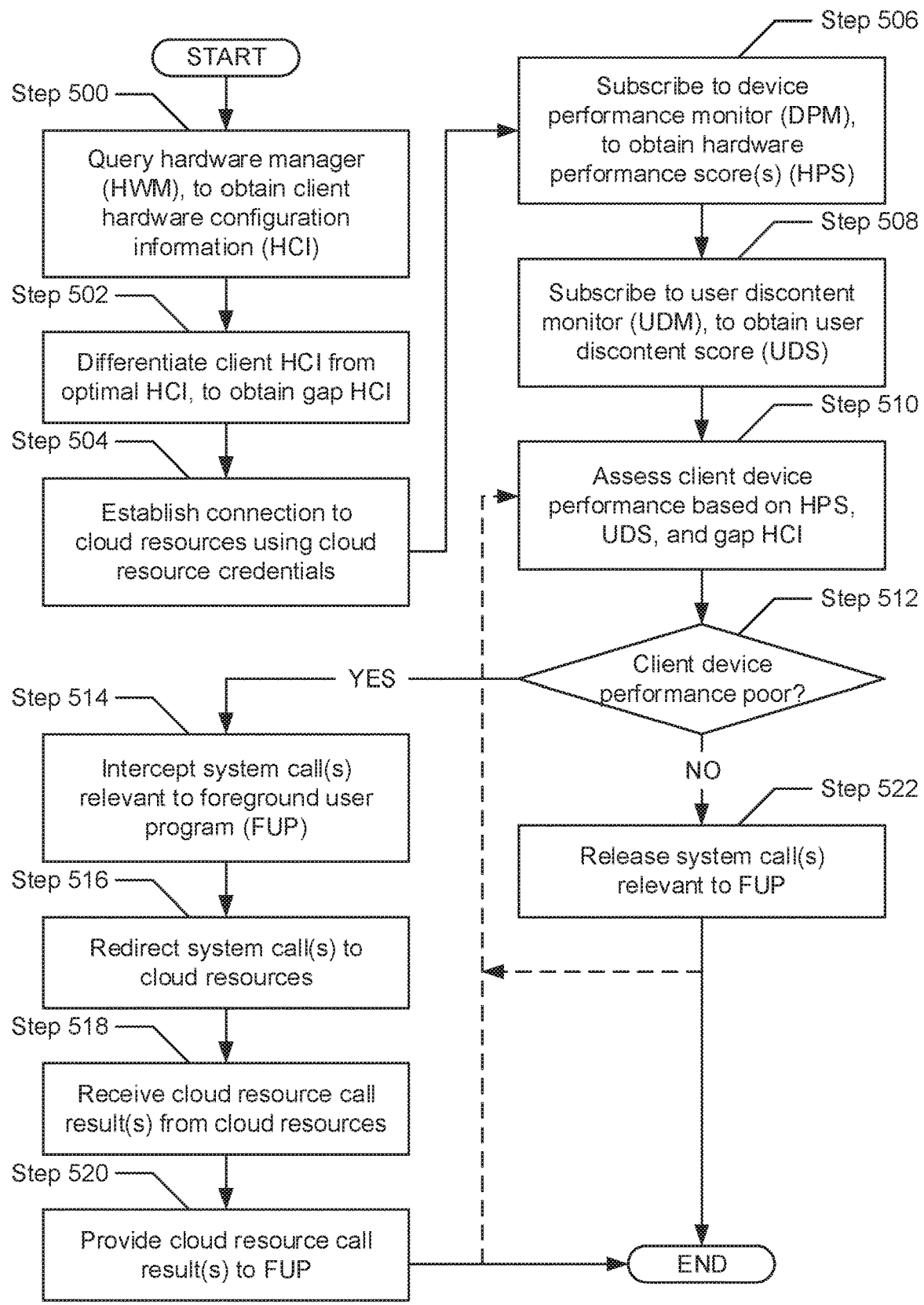
FIG. 5 shows a flowchart describing a method for performance-driven load shifting in accordance with one or more embodiments of the invention.

FIG. 5 shows a flowchart describing a method for performance-driven load shifting in accordance with one or more embodiments of the invention. The various steps outlined below may be performed by the load shifting agent (LSA) executing on a client device (see e.g., FIG. 1B). Further, while the various steps in the flowchart(s) are presented and described sequentially, one of ordinary skill will appreciate that some or all steps may be executed in different orders, may be combined or omitted, and some or all steps may be executed in parallel.

Turning to FIG. 5, in Step 500, a hardware manager (HWM) (see e.g. FIG. 1B) is queried. In one embodiment of the invention, a response, from the HWM, to the query may include client hardware configuration information (HCI). Generally, HCI may refer to information disclosing the specification of a given computing system (see e.g., FIG. 6), which may include, but is not limited to, metadata describing hardware components and/or an operating system (OS) installed on the given computing system. By way of examples, HCI may encompass any subset or all of the following information: an identifier or name associated with the OS; a build or version number associated with the OS; a number of CPUs installed; an architecture (e.g., x86-based or x64-based) associated with the CPU(s); a number of cores or micro-cores in each CPU; a processing speed associated with the CPU(s); a number of GPUs installed; an architecture (e.g., x86-based or x64-based) associated with the GPU(s); a number of cores or micro-cores in each GPU; a capacity of PM installed; and a page size (or a size of a block of memory) associated with the PM. HCI may not be limited to the aforementioned examples. Accordingly, the client HCI, obtained following the query, may refer to a current HCI associated with the client device.

In Step 502, the client HCI (obtained in Step 500) is differentiated from an optimal HCI (described above) (see e.g., FIG. 4).

In Step 504, a connection to provisioned cloud computing resources (described above) (see e.g., FIG. 4) is established. In one embodiment of the invention, establishing the connection may entail submitting a connection request, including cloud computing resource credentials associated with the provisioned cloud computing resources, to a load shifting service (LSS) (see e.g., FIG. 1A). The LSS may represent an offload domain whereon at least the provisioned cloud computing resources may be made available, and where-to one or more user program workloads may be transferred (transparently or unbeknownst to the client device user) for processing in a higher performing environment. The established connection, and any subsequent information exchanges, between the client device (or specifically, the LSA executing on the client device) and the provisioned cloud computing resources may employ any protocol that facilitates data transfer over a network (e.g., the 5G mobile network).

In Step 506, a subscription to a device performance monitor (DPM) (see e.g., FIG. 1B) is requested. In one embodiment of the invention, a subscription may refer to the periodic, or continuous, delivery of a data resource from a data publisher (e.g., DPM) to one or more data subscribers (e.g., LSA). Further, the data resource published (i.e., delivered or provided), to registered subscribers, may include a real-time hardware performance score (HPS) measuring hardware component performance, at any given point in time, for each hardware component installed on the client device. The aforementioned hardware components may include any subset or all of the following physical components: one or more CPUs, one or more GPUs, memory, data storage, and network adapters or antennae. Hardware components installed on the client device may not be limited to the aforementioned examples.

In Step 508, a subscription to a user discontent monitor (UDM) (see e.g., FIG. 1B) is requested. In one embodiment of the invention, a subscription may refer to the periodic, or continuous, delivery of a data resource from a data publisher (e.g., UDM) to one or more data subscribers (e.g., LSA). Further, the data resource published (i.e., delivered or provided), to registered subscribers, may include a real-time user discontent score (UDS) measuring user satisfaction (or dissatisfaction) with the client device at any given point in time.

In Step 510, a performance associated with the client device is assessed. In one embodiment of the invention, the client device performance may be evaluated based on the HPS (obtained in Step 506), the UDS (obtained in Step 508), and the gap HCI (obtained in Step 502). Specifically, assessing the client device performance may entail deriving an overall performance grade or score, for the client device, from at least the aforementioned constituent information. Such an overall performance grade or score may be expressed using a numerical (e.g., $\{1, 2, 3, \ldots, 10\}$) or categorical (e.g., $\{$"low", "medium", "high"$\}$) value, which may map to a given, prescribed performance class.

In Step 512, a determination is made as to whether the client device performance (assessed in Step 510) is directed to a poor or low performance classification. Accordingly, in one embodiment of the invention, if it is determined that a poor or low performance classification is given to reflect the overall performance of the client device, then the process may proceed to Step 514. On the other hand, in another embodiment of the invention, if it is alternatively determined that a non-poor or non-low (e.g., high, medium, excellent, etc.) performance classification is given to reflect the overall performance of the client device, then the process may alternatively proceed to Step 522.

In Step 514, after determining (in Step 512) that a current performance (i.e., client device performance) associated with the client device is directed to a poor or low performance classification, one or more system calls is/are trapped and, subsequently, intercepted (i.e., redirected). In one embodiment of the invention, the intercepted system call(s) may be relevant to, and thus, may be issued by the FUP. A system call may refer to a service request, issued by a given computer program, that is usually directed to the operating system (OS) executing on a given client device, on which the given computer program is also executing. Examples of a system call (or a service thus requested) may include, but are not limited to, a process control service (e.g., loading a process, executing a process, terminating a process, creating a process, obtaining or setting one or more attributes associated with a process, allocating or deallocating memory for a process, etc.); a file management service (e.g., creating or deleting a file, opening or closing a file, reading from or writing to a file, obtaining or setting one or more attributes associated with a file, etc.); a device management service (e.g., requesting of resources provided by a hardware component, releasing of resources provided by a hardware component, reading or writing to a hardware component, obtaining or setting one or more attributes associated with a hardware component, logically attaching or detaching a hardware component, etc.); and a communication service (e.g., creating or deleting a communication connection, sending or receiving one or more messages, obtaining or setting transfer status information describing the transmission or reception of messages, etc.).

In Step 316, the system call(s) (intercepted in Step 514) is/are redirected to the provisioned cloud computing resources (connected to in Step 504). In one embodiment of the invention, redirection of the system call(s) may entail transmission of the system call(s) (transparently or unbeknownst to the client device user) to the provisioned cloud computing resources for processing. Had the system call(s)

not been intercepted, the system calls(s) may alternatively be processed by the device operating system (DOS) installed on the client device.

In Step 518, one or more call results processed by, and from, the provisioned cloud computing resources is received. Specifically, in one embodiment of the invention, a call result may refer to a service response, in this case generated by the provisioned cloud computing resources in response to the service request (i.e., system call) (redirected in Step 516) issued by the requesting computer program (e.g., FUP). Thereafter, in Step 520, the call result(s) (received in Step 518) is/are provided to the FUP executing on the client device, which had sourced the system call(s) (intercepted in Step 514).

In Step 522, after alternatively determining (in Step 512) that a current performance (i.e., client device performance) associated with the client device is directed to a non-poor or non-low (e.g., "medium", "high", etc.) performance classification, one or more system calls is/are trapped and, subsequently, released. In one embodiment of the invention, the released system call(s) may be relevant to, and thus, may be issued by the FUP. Further, by releasing the aforementioned system call(s), the system call(s) may continue forth to the device operating system (DOS) installed on the client device, which would process the system call(s).

In one embodiment of the invention, following either the providing of the call result(s) (in Step 520) or the release of system call(s) (in Step 522), the process may cycle back to Step 510 or end. Regarding the former case, at Step 510, another client device performance may be assessed, which may reflect a same or different overall performance score associated with the client device for a subsequent point in time. Alternatively, regarding the latter case, the client device user may cease interaction with the FUP (e.g., by exiting the FUP, closing the FUP UI, etc.), which would lead to the termination of the process.

FIG. 6 shows a computing system in accordance with one or more embodiments of the invention. The computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a central processing unit (CPU) and/or a graphics processing unit (GPU). The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In one embodiment of the invention, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performance-driven load shifting, comprising:
   assessing a first client device performance, associated with a client device, while at least a foreground user program (FUP) is executing on the client device;
   making a first determination that the first client device performance is low; and
   shifting, based on the first determination, a workload for the FUP to an offload domain,
   wherein the offload domain is a load shifting service (LSS) operatively connected to the client device through a mobile network, and
   wherein shifting the workload for the FUP to the offload domain, comprises:
      intercepting a first client input device output relevant to the workload, wherein the first client input device output is associated with a client input device of the client device;
      redirecting the first client input device output to a virtual resource hosted on the offload domain;
      receiving, from the offload domain, graphics rendered by the virtual resource based at least on the first client input device output; and
      presenting the graphics to a client device user operating the client device.

2. The method of claim 1, further comprising:
   prior to assessing the first client device performance:
      obtaining client hardware configuration information (HCI) associated with the client device;
      differentiating the client HCI against optimal HCI, to obtain gap HCI;
      obtaining, respectively, a set of hardware performance scores (HPS) associated with a set of hardware components installed on the client device; and
      obtaining a user discontent score (UDS) associated with the client device,
      wherein the first client device performance is assessed based on the gap HCI, the HPS, and the UDS.

3. The method of claim 2, further comprising:
prior to obtaining the client HCI:
- identifying the FUP from a task management list (TML);
- obtaining FUP metadata describing the FUP using a FUP identifier (ID) associated with the FUP; and
- obtaining, based on at least a portion of the FUP metadata, the optimal HCI from a crowdsourcing population database (CPD).

4. The method of claim 1, further comprising:
prior to assessing the first client device performance:
- generating, of the client device, a client image comprising the FUP and user data relevant to the FUP;
- submitting, to the offload domain, at least the client image and optimal hardware configuration information (HCI) for executing the FUP;
- receiving, from the offload domain, virtual resource credentials for the virtual resource; and
- establishing, through the mobile network, a connection to the virtual resource using the virtual resource credentials,
- wherein the virtual resource is allocated cloud resources comparable to the optimal HCI and is configured using the client image.

5. The method of claim 1, further comprising:
- assessing a second client device performance, associated with the client device, while at least the FUP is executing on the client device;
- making a second determination that the second client device performance is non-low; and
- releasing, based on the second determination, a second client input device output relevant to the workload, wherein the second client input device output is associated with the client input device of the client device.

6. The method of claim 1, wherein shifting the workload for the FUP to the offload domain, comprises:
- intercepting a first system call relevant to the workload, wherein the first system call is issued by the FUP;
- redirecting the first system call to cloud resources of the virtual resource available on the offload domain;
- receiving, from the offload domain, a call result derived by the cloud computing resources based at least on the first system call; and
- providing the call result to the FUP.

7. The method of claim 6, further comprising:
prior to assessing the first client device performance:
- submitting, to the offload domain, at least optimal hardware configuration information (HCI) for executing the FUP;
- receiving, from the offload domain, cloud resource credentials for the cloud resources; and
- establishing, through the mobile network, a connection to the cloud resources using the cloud resource credentials,
- wherein the cloud resources made available are comparable to the optimal HCI.

8. The method of claim 6, further comprising:
- assessing a second client device performance, associated with the client device, while at least the FUP is executing on the client device;
- making a second determination that the second client device performance is non-low; and
- releasing, based on the second determination, a second system call relevant to the workload, wherein the second system call is issued by the FUP.

9. A system, comprising:
- a client device comprising a computer processor;
- a load shifting agent (LSA) executing on the computer processor, and programmed to:
  - assess a client device performance, associated with the client device, while at least a foreground user program (FUP) is further executing on the computer processor;
  - make a determination that the client device performance is low; and
  - shift, based on the determination, a workload for the FUP to an offload domain, wherein shifting the workload for the FUP to the offload domain, comprises:
    - intercepting a first client input device output relevant to the workload, wherein the first client input device output is associated with a client input device of the client device;
    - redirecting the first client input device output to a virtual resource hosted on the offload domain;
    - receiving, from the offload domain, graphics rendered by the virtual resource based at least on the first client input device output; and
    - presenting the graphics to a client device user operating the client device;
- a load shifting service (LSS) operatively connected to the client device, wherein the LSS is the offload domain; and
- wherein the client device and the LSS are operatively connected through a mobile network.

10. A non-transitory computer readable medium (CRM) comprising computer readable program code, which when executed by a computer processor, enables the computer processor to:
- assess a first client device performance, associated with a client device, while at least a foreground user program (FUP) is executing on the client device;
- make a first determination that the first client device performance is low; and
- shift, based on the first determination, a workload for the FUP to an offload domain,
  - wherein the offload domain is a load shifting service (LSS) operatively connected to the client device through a mobile network, and
  - wherein shifting the workload for the FUP to the offload domain, comprises:
    - intercepting a first client input device output relevant to the workload, wherein the first client input device output is associated with a client input device of the client device;
    - redirecting the first client input device output to a virtual resource hosted on the offload domain;
    - receiving, from the offload domain, graphics rendered by the virtual resource based at least on the first client input device output; and
    - presenting the graphics to a client device user operating the client device.

11. The non-transitory CRM of claim 10, further comprising computer readable program code, which when executed by the computer processor, enables the computer processor to:
prior to assessing the first client device performance:
- obtain client hardware configuration information (HCI) associated with the client device;
- differentiate the client HCI against optimal HCI, to obtain gap HCI;

obtain, respectively, a set of hardware performance scores (HPS) associated with a set of hardware components installed on the client device; and obtain a user discontent score (UDS) associated with the client device, wherein the first client device performance is assessed based on the gap HCI, the HPS, and the UDS.

12. The non-transitory CRM of claim 11, further comprising computer readable program code, which when executed by the computer processor, enables the computer processor to:

prior to obtaining the client HCI:
identify the FUP from a task management list (TML);
obtain FUP metadata describing the FUP using a FUP identifier (ID) associated with the FUP; and
obtain, based on at least a portion of the FUP metadata, the optimal HCI from a crowdsourcing population database (CPD).

13. The non-transitory CRM of claim 10, further comprising computer readable program code, which when executed by the computer processor, enables the computer processor to:

prior to assessing the first client device performance:
generate, of the client device, a client image comprising the FUP and user data relevant to the FUP;

submit, to the offload domain, at least the client image and optimal hardware configuration information (HCI) for executing the FUP;

receive, from the offload domain, virtual resource credentials for the virtual resource; and establish, through the mobile network, a connection to the virtual resource using the virtual resource credentials, wherein the virtual resource is allocated cloud resources comparable to the optimal HCI and is configured using the client image.

14. The non-transitory CRM of claim 10, further comprising computer readable program code, which when executed by the computer processor, enables the computer processor to:

shift the workload for the FUP to the offload domain, by:
intercepting a first system call relevant to the workload, wherein the first system call is issued by the FUP;
redirecting the first system call to cloud resources of the virtual resource available on the offload domain;
receiving, from the offload domain, a call result derived by the cloud computing resources based at least on the first system call; and
providing the call result to the FUP.

* * * * *